(12) United States Patent
Virzi et al.

(10) Patent No.: US 9,526,372 B2
(45) Date of Patent: Dec. 27, 2016

(54) BEVERAGE DISPENSING MACHINE

(75) Inventors: Andrea Virzi, Vittorio Veneto (IT);
Duilio Capraro, Conegliano Veneto (IT); Christian Ceotta, Nervesa Della Battaglia (IT); Vania Foltran, Cordignano (IT)

(73) Assignee: I.R.C.A. S.P.A. INDUSTRIA RESISTENZE CORAZZATE E AFFINI, San Vendemiano (IT)

( * ) Notice: Subject to any disclaimer, the term of this patent is extended or adjusted under 35 U.S.C. 154(b) by 661 days.

(21) Appl. No.: 13/638,391

(22) PCT Filed: Apr. 1, 2010

(86) PCT No.: PCT/IB2010/051424
§ 371 (c)(1),
(2), (4) Date: Sep. 28, 2012

(87) PCT Pub. No.: WO2011/121395
PCT Pub. Date: Oct. 6, 2011

(65) Prior Publication Data
US 2013/0025468 A1 Jan. 31, 2013

(51) Int. Cl.
A23F 5/00 (2006.01)
A47J 31/54 (2006.01)

(52) U.S. Cl.
CPC ............... A47J 31/54 (2013.01); A47J 31/542 (2013.01)

(58) Field of Classification Search
CPC ................................. A47J 31/542; A47J 31/54
USPC ........ 99/323.3, 288; 392/473, 480; 219/441, 219/439, 448.11, 465.1, 504, 553
See application file for complete search history.

(56) References Cited

U.S. PATENT DOCUMENTS

| 4,508,957 | A | | 4/1985 | Rocchitelli |
| 4,869,160 | A | * | 9/1989 | Pratolongo ..................... 99/330 |
| 5,914,063 | A | * | 6/1999 | Taylor et al. ................. 219/438 |
| 6,121,586 | A | * | 9/2000 | Taylor et al. ................. 219/438 |
| 2002/0175161 | A1 | * | 11/2002 | Glucksman ................... 219/432 |
| 2003/0136776 | A1 | * | 7/2003 | Ito .............................. 219/444.1 |

FOREIGN PATENT DOCUMENTS

| DE | 28 08 182 A1 | 8/1979 |
| EP | 0 906 984 A1 | 4/1999 |
| GB | 2 330 402 A | 4/1999 |
| WO | WO96/18331 A1 | 6/1996 |

OTHER PUBLICATIONS

International Search Report, Jan. 20, 2011, IntlSearchingAuthority.

* cited by examiner

Primary Examiner — Jianying Atkisson
(74) Attorney, Agent, or Firm — Davis, Malm & D'Agostine, P.C.

(57) ABSTRACT

A machine for dispensing hot beverages, e.g. coffee, comprising a liquid heater, in particular for heating water intended for human consumption, provided with a container, adapted to be at least partially filled with a first liquid to be heated, and a heating electric resistor arranged outside the container, in contact with the bottom of said container, so as to indirectly heat said first liquid through said bottom.

15 Claims, 6 Drawing Sheets

BEVERAGE DISPENSING MACHINE

FIELD OF THE INVENTION

The present invention relates to a machine for dispensing hot beverages, such as coffee, comprising a liquid heater, in particular for heating water intended for human consumption.

STATE OF THE ART

Hot beverage dispensing machines comprise liquid, particularly water, heaters.

In particular, electric heaters are the most commonly used when hot water is required very quickly.

A first type of heaters comprises a container, through which the liquid to be heated flows, in which an electric serpentine is submerged.

This, however, tends to be very rapidly coated by the solid residues dissolved in the liquid to be heated, particularly when the water is hard.

This type of heater is not of the preferred type because the heated water is intended for human consumption.

For this purpose, the known art suggests heaters which comprise a water heating circuit about which an electric resistor is externally wound. Therefore, the passage of liquid through said segment provides for its heating, without direct contact between the electric resistors and the water to be heated.

These devices are used also in small-sized apparatuses, such as for example coffee machines, in which reducing the heater size is particularly important.

A solution suggested in the prior art provides for the heated circuit segment being wound as a spiral and enclosed in a container or housing. When the heater is small compared to the temperature to be reached, particularly high temperatures are then reached in the heated circuit segment. The position of the heating circuit in the heating liquid causes the problem of accumulation of solid residues within the heated circuit and the formation of lime scale, which encrusts the resistor and parts of the heater. Other disadvantages which appear in these heaters are the possibility of corrosion of the resistor sheath by the water, which may come into contact with electric parts, and the difficulty of controlling the temperature of the resistor within the heater.

A further disadvantage is the need for the fluid to be present in the heater before starting to heat, or at least for the fluid to cover the heating element, and that the fluid level is maintained during operation.

A second type of heaters allows to overcome the aforesaid problems by providing the electric heating resistor outside the container and in contact with the container itself, crossed by the liquid to be heated.

However, specific supporting means are disadvantageously needed to accommodate and support the control/safety devices, e.g. comprising a thermostat. These devices are normally fixed to said supporting means and, in turn, brazed onto a second plate, preferably made of aluminium, welded to a first closing plate of the cap. Said supporting means (despite being made of aluminium) thus form in turn a heating resistor, worsening thermal transmission towards the devices themselves.

Alternatively, these control/safety devices are directly fixed to a steel wall of the container cap, worsening in all cases heat transmission to the devices themselves.

A need is therefore felt to make a hot beverage dispensing machine comprising a liquid heater capable of overcoming the aforesaid drawbacks.

SUMMARY OF THE INVENTION

It is the object of the present invention to provide a hot beverage dispensing machine, comprising a liquid heater capable of improving heat transmission to the heat control/safety devices associated with said heater.

A further object of the present invention is to provide a heater in which the heat control/safety devices are accommodated in an extremely compact manner.

It is the object of the present invention a hot beverage dispensing machine which, in accordance with claim 1, comprises a liquid heater, said heater being provided at least with:
- a container, adapted to be at least partially filled with a first liquid to be heated, defined by a cap closed by a first plate;
- a second plate, fixed to said first plate, outside the container;
- an electric heating resistor, arranged outside the container, fixed in contact with said second plate, so as to indirectly heat said first liquid through said first and second plates;

wherein said second plate is provided with a respective projection radially and externally protruding from the cap, heat control and safety devices directly connected to said electric resistor being fixed to said projection.

An advantageous variant of the heater of the hot beverage dispensing machine object of the present invention includes at least one pipe for the passage of a second liquid, said pipe crossing the container and being in thermal transmission contact with said first liquid, acting as a heat transmitting means, so that said second liquid is indirectly heated by heating the first liquid.

A heater of this kind allows to indirectly heat a liquid through the first and second plates and possibly also through said heat transmitting fluid means. This determines a considerable reduction of the accumulation of saline and/or metal residues dissolved in the same liquid within the heating water circuit itself, with the advantage of not altering the circuit, and with the advantage of not deteriorating the performance of the heater itself.

For example, the following two variants are provided for applying the heater of the invention in professional espresso coffee machines.

In the variant without pipe for the passage of the second liquid, the first liquid (which is water) is heated within the container, thus producing either hot water or steam according to the desired use.

In the variant with pipe for the passage of the second liquid, the first liquid (which is water) is heated within the container, thus producing either hot water or steam according to the desired use while the second liquid is heated by virtue of the contact between the first liquid and the pipe of said second liquid (which is also water), thus producing hot water.

In the variant in which the resistor is at the bottom of the container, the liquid level within the container is not important because the electric resistor is arranged outside the container and is not immersed in the fluid.

In an advantageous variant, the resistor is substantially flat and placed outside on the flat bottom of the container when it is inserted in the machine for which it is intended.

The dependent claims describe preferred embodiments of the invention, thus forming an integral part of the present description.

BRIEF DESCRIPTION OF THE DRAWINGS

Further features and advantages of the invention will be more apparent in the light of the detailed description of preferred, but not exclusive, embodiments, of a liquid heater of a hot beverage dispensing machine, illustrated by way of non-limitative example, with the aid of the accompanying drawings, in which.

The same reference numbers and letters in the drawings refer to the same elements or components.

DETAILED DESCRIPTION OF A PREFERRED EMBODIMENT OF THE INVENTION

Figure 1:
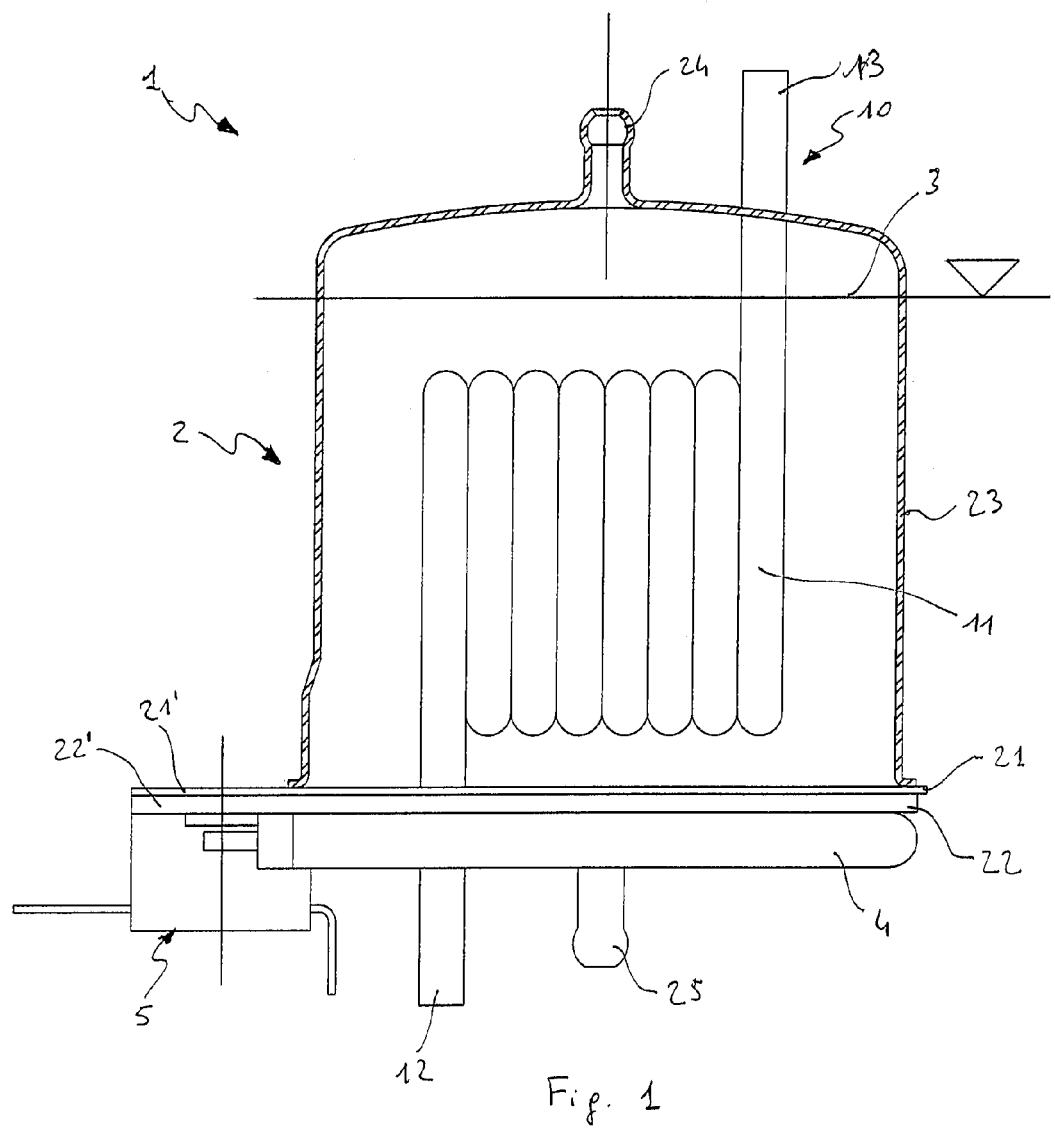
FIG. 1 shows a section view of a first embodiment of a beverage dispensing machine heater according to the invention.
Figure 2:
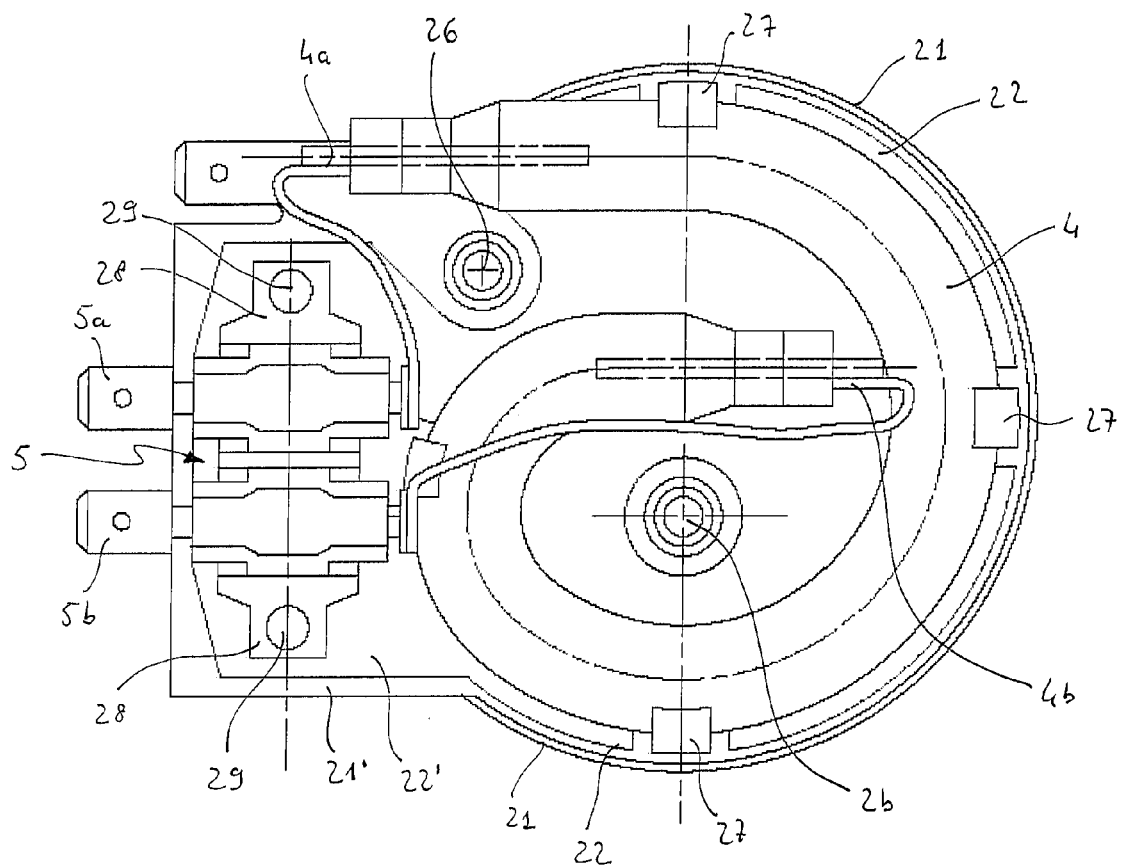
FIG. 2 shows a bottom view of the heater in FIG. 1.
Figure 7:
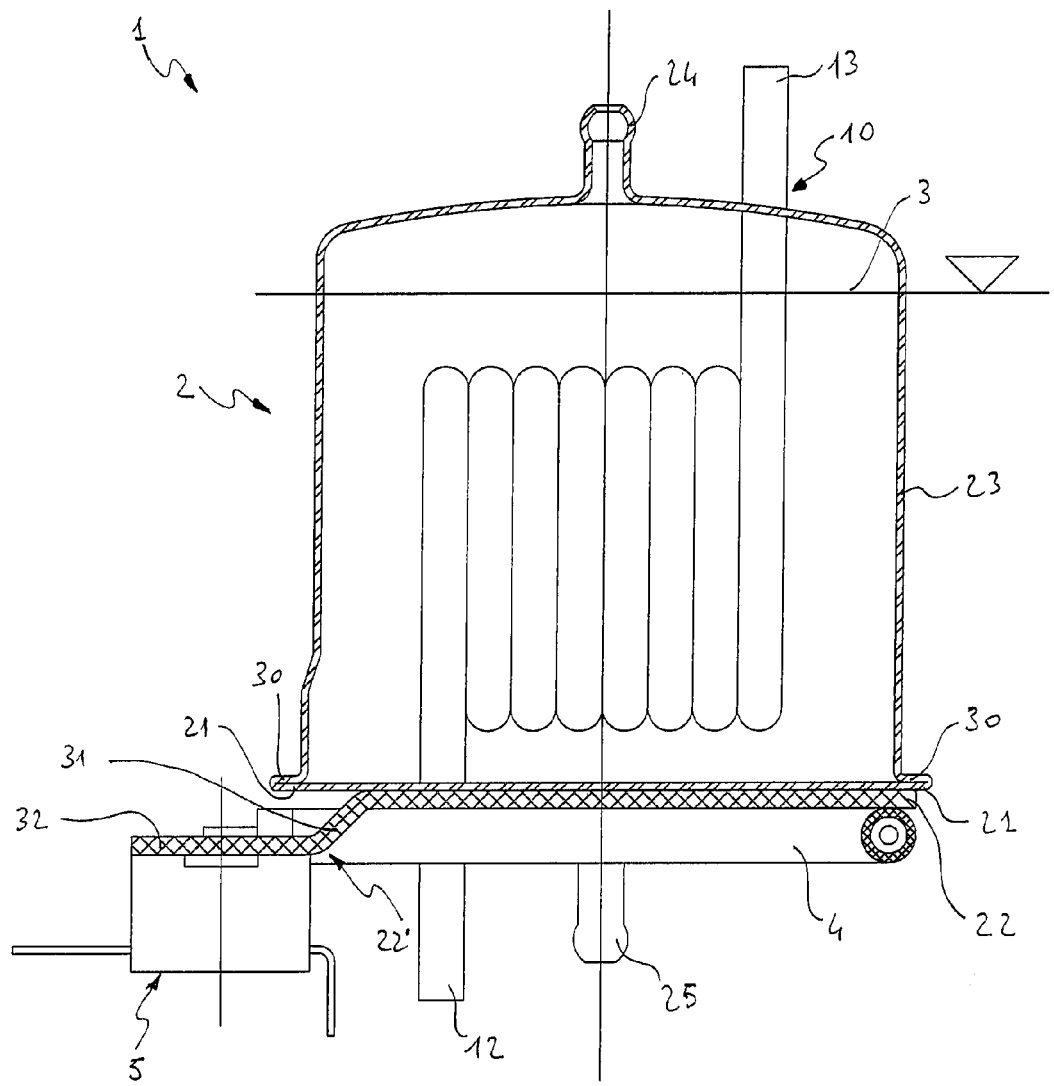
FIG. 7 shows a section view of a second embodiment of a beverage dispensing machine heater according to the invention.
Figure 9:
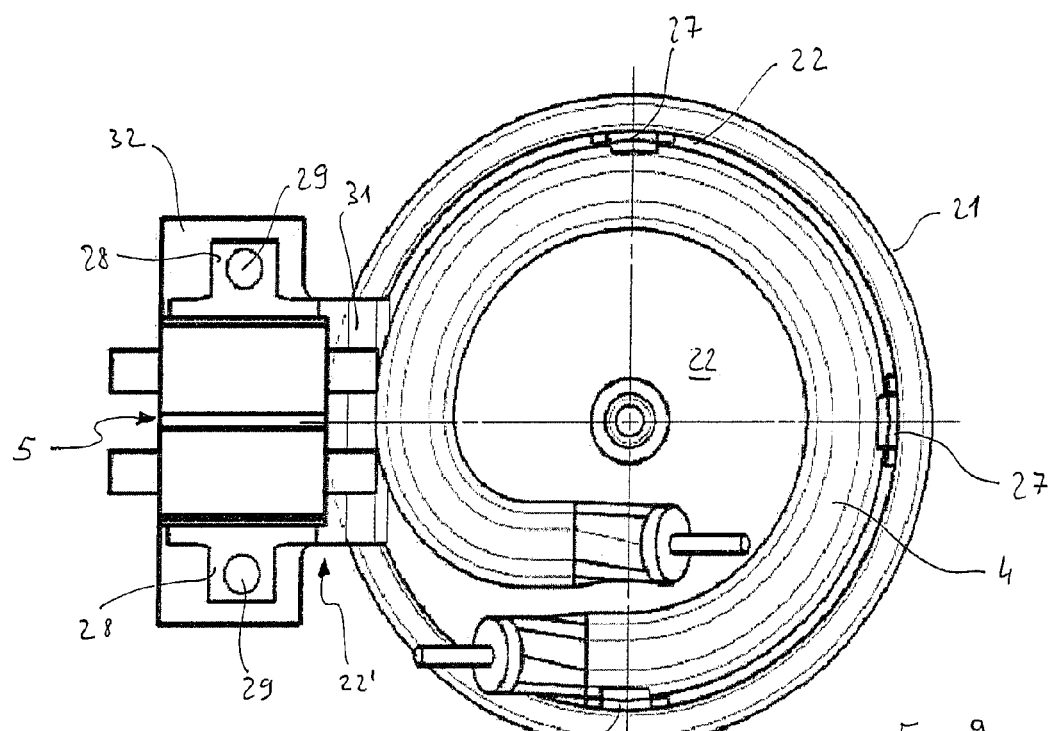
FIG. 9 shows a bottom view of the heater in FIG. 8.
Figure 8:
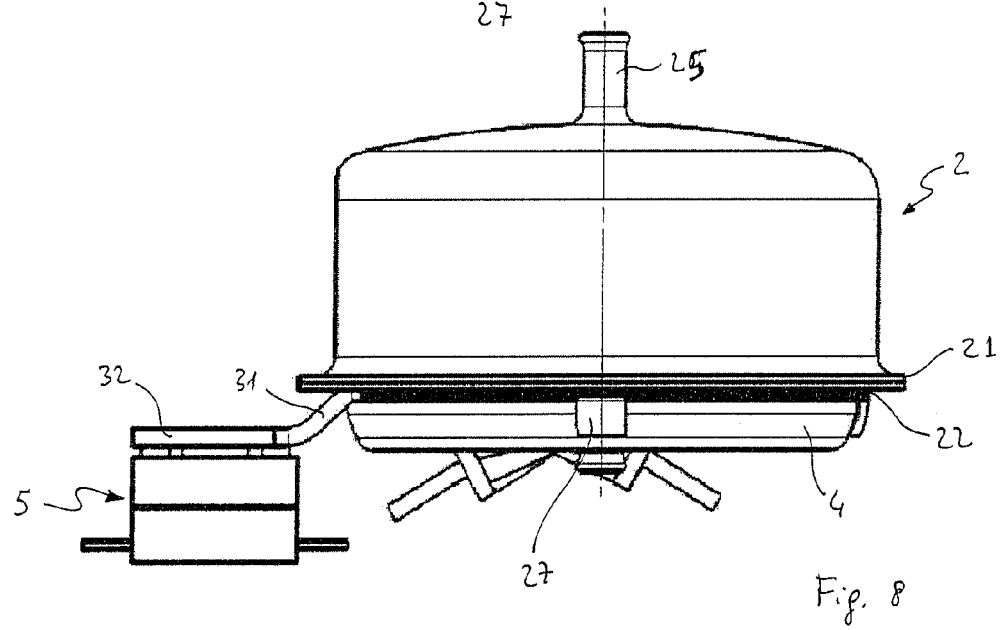
FIG. 8 shows a side view of a third embodiment of a beverage dispensing machine heater according to the invention.

The heater of a hot beverage dispensing machine, object of the present invention, according to FIGS. 1 and 7, comprises a container 2 filled with a liquid 3, which in the specific example is water. An electric heating resistor 4, best seen in FIG. 2, is arranged outside on the base of container 2, which resistor heats the liquid 3 within the container itself.

In a first variant, a heating water circuit segment or pipe 10, possibly comprising a spiral-shaped segment 11, i.e. a segment wound as a spiral, is immersed in liquid 3. The ends 12 and 13 of the heating water circuit segment 10 are adapted to be connected to an external circuit, through which a further liquid to be heated circulates. In particular, the end 12 for introducing the liquid to be heated preferably crosses the base of container 2, i.e. it is on the same side as the electric resistor 4 when suitably orientating the heater for working. Extremities 12 and 13 preferably cross the container 2 from opposite sides.

Hence, said heating water circuit segment 10 is indirectly heated by means of liquid 3 which acts as a heat transmission means. The liquid 3 is indirectly heated through the base of container 2, with which the electric resistor 4 is externally associated.

A second advantageous variant does not provide for the presence of the heating circuit water segment or pipe 10 immersed in the liquid 3 within the container 2. Also in this case, the liquid 3 is indirectly heated through the base of container 2.

In both preferred variants, said resistor 4 is a flat serpentine, intentionally outside container 2 to avoid saline deposits from being attached directly thereon, which normally determines a more rapid deterioration thereof.

Figure 4:
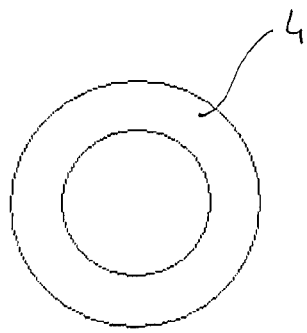
FIG. 4 shows a circular section of a serpentine.
Figure 5:
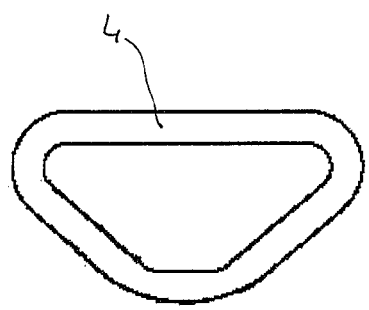
FIG. 5 shows the section of the serpentine in FIG. 4 after pressing it.
Figure 6:
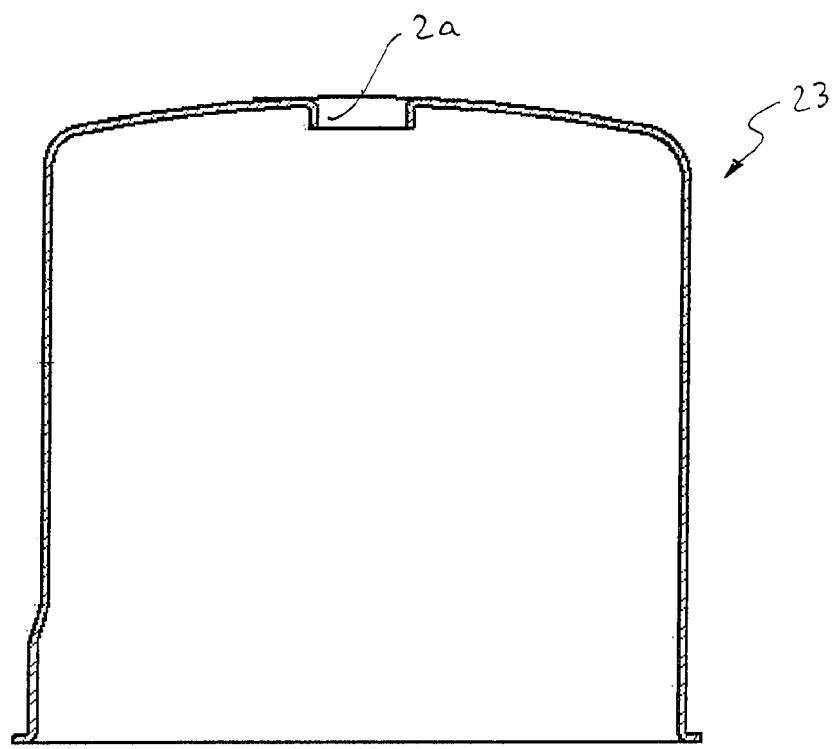
FIG. 6 shows a cap belonging to the container in FIG. 1.

In order to increase the thermal efficiency of heater 1, the serpentine is preferably pressed in the transversal direction: FIGS. 4 and 5 show a circular-section serpentine and a pressed-section serpentine, respectively. The serpentine is externally attached to the bottom of container 2, preferably by means of welding-brazing.

According to the preferred embodiments of the invention, container 2 has a hot fluid outlet opening 2a placed on the upper part of the same with respect to the orientation of the heater in operation, which is typically the wall opposite to that on which the electric resistor 4 is located.

The hot water or steam which exits the opening 2a is replaced in the container by other water introduced through the opening 2b, which may be positioned in whatever manner in the container, preferably close to resistor 4, so as to be heated immediately after it is introduced in the container 2. In the variants in FIGS. 1 and 7, the opening 2b is provided on the bottom of container 2 and is substantially at the opening 2a provided on the upper part of container 2, opposite to said bottom.

Within the container, in front of the opening 2b, a baffle is advantageously arranged to avoid the entering cold fluid from creating a direct flow towards the opening 2a and to favor the fluid mixing in the container.

The introduction of water 3 may be controlled by means of a probe or level sensor or equivalent means.

Figure 3:
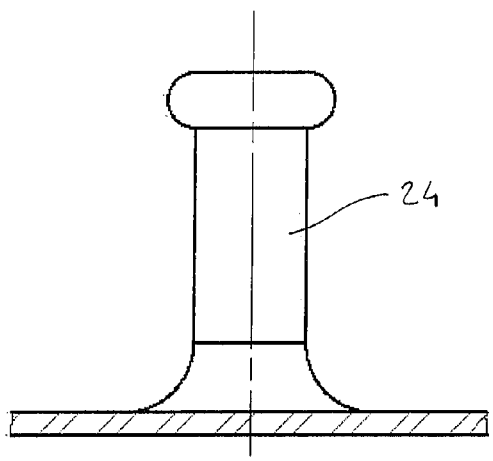
FIG. 3 shows a connection lip at the openings of the container seen in FIG. 1.

With reference to FIGS. 1 and 3, opening 2a and opening 2b preferably comprise a lip 24, 25 with rounded, enlarged end, for better connecting to an external circuit and for feeding cold water, as well as for recovering steam or hot water.

The container 2 preferably comprises an open cap 23, occluded to form the container 2 by a first plate 21, to which a second plate 22, preferably made of aluminium, aluminium alloy or other good heat conducting material, is externally arranged by the side and welded-brazed. Serpentine 4 is welded-brazed to said second plate 22.

Both the cap 23 and said first closing plate 21 are preferably made of stainless steel. Cap 23 is obtained by drawing. Thereby, the cap itself is provided with the opening 2a, also obtained by means of the same drawing process.

The plate 21 to be coupled to close the cap 23 is obtained by shearing and drawing in order to be provided with the opening 2b.

The electric resistor 4, preferably in the form of a serpentine, is either integrated in plate 22 or fixed thereto by brazing, and is transversally pressed so as to have a substantially flat side to provide a better contact surface with the plate 22. Thereby, the heat exchange between heating resistor 4 and fluid in the container 2 is improved.

The end 12 of the possible pipe or exchanger 10 crosses container 2 by means of the opening 26 (FIG. 2) at the plates 21 and 22.

Advantageously, the plate 22 is conveniently shaped to accommodate heat control and safety devices, comprising a thermostat and a thermal fuse. The particular location of this housing allows to reduce dimensions, both the intrinsic positioning dimensions of the electric resistor and the external dimensions of the heater (e.g. as compared to heaters with internal resistors). Furthermore, the liquid content to be heated may be considerably reduced according to the final working conditions of the heater, thus saving energy. The space inside the container or heater 2 is all usable and further allows to accommodate the heating water circuit segment or pipe or exchanger 10, the dimensioning of which has no geometrical constraint, but is only functional and dictated by the operation in the final apparatus (e.g. a coffee machine).

In a first embodiment of the invention, shown in FIGS. 1 and 2, the first steel plate 21, defining a first surface which closes the cap 23, is provided with a projection 21' externally protruding from the cap 23. Said projection 21' is arranged on the same surface defined by the first plate 21.

The second plate 22 is fixed by brazing underneath the first plate 21, thus defining a second surface parallel to said first surface.

Said second plate 22 is also provided with a projection 22' radially and externally protruding from the cap 23. Said projection 22' is arranged on the same second surface defined by the second plate 22. Advantageously, the projection 22' of the second plate 22' is at the projection 21' of the first plate 21 and has a smaller surface than said projection 21'.

As shown in FIG. 2, the electric resistor 4 is either integrated with or fixed to the second plate 22, e.g. by means of welding-brazing and/or by means of appropriate folds 27 of plate 22, in order to centre the resistor 4 with respect to the cap 23. The heat control and safety devices 5, comprising a thermostat and a thermal fuse, are advantageously accommodated on the projection 22'. The casing containing the thermostat and the thermal fuse is advantageously provided with simple side flaps 28 which are fixed to the projection 22' of the second plate 22 by means of appropriate fastening means, e.g. by means of screws (not shown), at appropriate fastening points 29.

Such an advantageous solution does not require additional support components of the heat control and safety devices. These devices are normally fixed to further support means, different from the plates 21 and 22, which are brazed onto the plate 22. This disadvantageously implies a further deterioration of the thermal transmission to the control/safety devices associated with the heater of the beverage dispensing machine, said further supporting means brazed on the plate 22 forming a heating resistor in turn.

This solution further allows an effective coupling between the cap 23 and the first plate 21, both made of steel. Such a coupling facilitates joining edges by means of welding, e.g. laser welding, without requiring mechanical or electric adjustments of the welding apparatus during the operation.

In particular, the first embodiment (FIGS. 1 and 2) is compatible with laser welding because the thermal influence of the steel-steel fusion which generates the laser welding is not so extended to concern the aluminium of second plate 22 and sheath of the electric resistor 4.

In a second embodiment of the invention, shown in FIG. 7, the first plate 21 made of steel defines a first surface which closes the cap 23 but is not provided with the projection 21', included in the first embodiment of the invention. Plate 21 has a flat shape so as to perfectly close the cap 23 and is welded to the welding edge 30 of the cap itself.

The second plate 22 at least partially defining a second surface parallel to said first surface is fixed by brazing underneath the first plate 21.

Said second plate 22 is advantageously provided with a projection 22' radially protruding outwards from the cap 23. Unlike the first embodiment, said projection 22' is not arranged on the same second surface. Advantageously, the projection 22' has a first portion 31, defining a third inclined surface with respect to said second surface, and a second portion 32 defining a fourth surface which is substantially parallel to said first and second surfaces.

As shown in FIG. 7, the electric resistor 4 is integrated or fixed, e.g. by means of welding-brazing and/or by means of appropriate flaps 27 of plate 22, to the part of the second plate 22 defining the second surface for centering the resistor 4 with respect to the cap 23.

The heat control and safety devices 5 comprising a thermostat and a thermal fuse are advantageously accommodated on the second portion 32 of protrusion 22'. The casing containing thermostat and thermal fuse is advantageously provided with simple side flaps 2, 8 which are fixed to said portion 32 by means of appropriate fastening means, e.g. by means of screws (not shown), at appropriate fastening points 29.

The misalignment of projection 22' from the second surface of plate 22 advantageously allows to keep the control/safety device at a greater distance form the welding edge 30 between the cap 23 and the first plate 21, in all cases allowing an effective coupling of the edges for a continuous, homogenous welding operation without varying the mechanical and electric setting adjustments of the welding apparatus.

Figure 10:
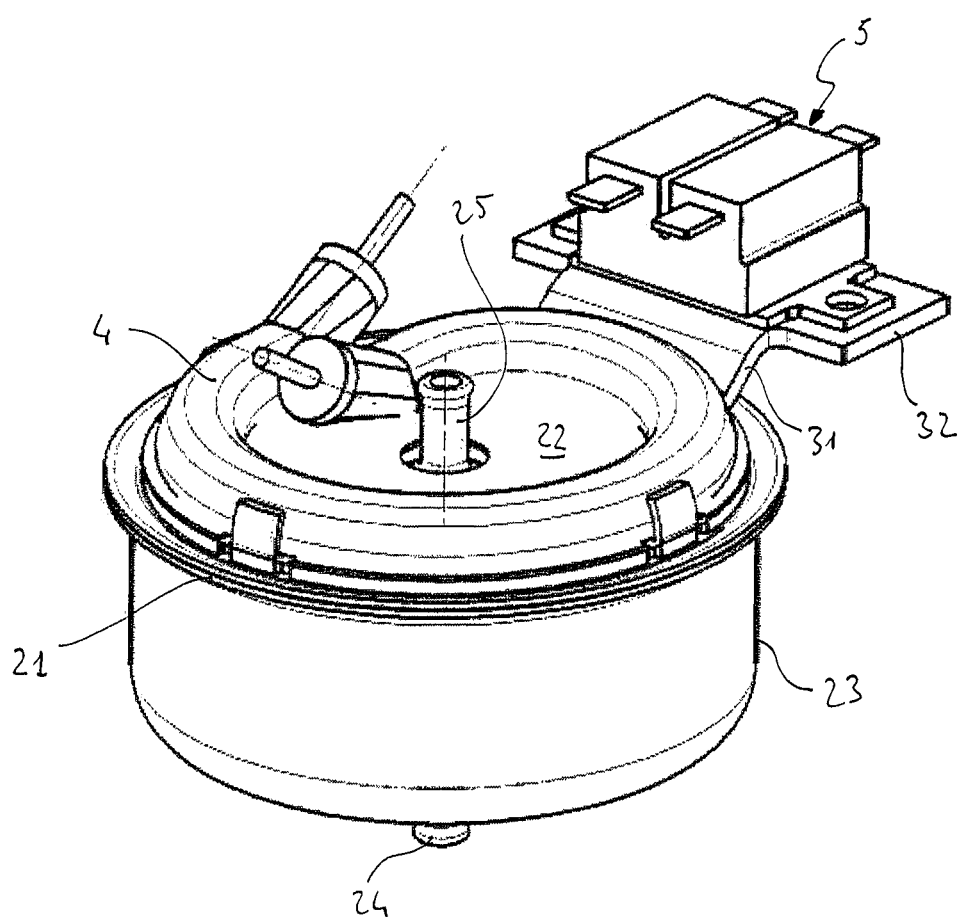
FIG. 10 shows a perspective bottom view of the heater in FIG. 8.

A third embodiment of the invention is shown in Figures from 8 to 10. It substantially corresponds to the second embodiment in FIG. 7. FIG. 10 shows an upside-down heater to better illustrate the main components according to the present invention.

Unlike said second embodiment, this third embodiment does not include the heat exchanger 10 within container 2.

In all three embodiments described above, the temperature of liquid 3 is adjusted by the thermostat outside the container 2, which supplies the resistor 4 through the terminals 4a and 4b (see FIG. 2, in particular). Resistor 4 being outside the container 2 and directly in contact with the thermostat, the thermostat reaction is more immediate and reduces the possibility of overheating. The presence of the aluminium plate 22 interposed between the base of container 2 and the resistor 4 improves the heat exchange between the heating resistor and the fluid in the container.

The thermostat in turn is adapted to be connected to an external electric source by means of its terminals 5a and 5b.

In another variant, a temperature sensor (not shown) may be at least partially provided so as to be immersed within the container 2.

The features disclosed in the preferred embodiments (shown here) may be present as a whole or in part, not altering the innovative concept of the invention. The different embodiments described above may also be combined to one another.

The advantages of the present invention are apparent:
it improves heat transmission to the control/safety devices associated with the heater;
its reduces the global dimensions of said control/safety devices;
it allows a direct control of the resistor temperature, even if there is no water;
a heat exchanger may be arranged within the heater for a second function;
it facilitates the manufacturing of the device of the invention by brazing the resistor on the plates which are then welded on the cap,
it improves the duration of the heating resistor, because it is placed outside the container, so that said deposits are not directly sedimented thereon and the problem of corrosion is eliminated;
the fluid level within the container has little influence on the correct operation of the heater because a small amount of fluid which covers the bottom is sufficient for its operation, and also in the case of total lack of fluid, there is a lower risk of overheating;

the operations of removing lime scale from the device are facilitated and simplified, because the resistor is not in contact with the fluid.

The specific embodiments described herein do not limit the content of this application which covers all the variants of the invention defined by the claims.

The invention claimed is:

1. A beverage dispensing machine comprising a liquid heater, said liquid heater being provided with at least:
   a container, adapted to be at least partially filled with a first liquid to be heated, defined by a cap closed by a first plate made of heat conducting material, wherein said container comprises a first opening for releasing a portion of the first liquid, in the form of liquid or steam, and a second opening for introducing a further amount of first liquid for replacing the released portion of the first liquid;
   a second plate made of heat conducting material and fixed to said first plate, outside the container;
   an electric heating resistor, arranged outside the container, fixed in contact with said second plate, so as to indirectly heat said first liquid through said first and second plates;
   wherein said second plate is provided with a respective projection radially and externally protruding from the cap and said first plate, heat control and safety devices being fixed to said respective projection connected to said electric heating resistor.

2. The machine according to claim 1, wherein said first plate is provided with a respective projection, radially and externally protruding from the cap and arranged on a first surface defined by the first plate itself.

3. The machine according to claim 2, wherein said second plate defines a second surface parallel to said first surface.

4. The machine according to claim 3, wherein the projection of the second plate is arranged on said second surface.

5. The machine according to claim 4, wherein the projection of the second plate is arranged at the projection of the first plate.

6. The machine according to claim 1, wherein said first plate defines a first surface and is shaped so as to close the cap, being welded to an edge of the cap itself.

7. The machine according to claim 6, wherein said second plate at least partially defines a second surface parallel to said first surface.

8. The machine according to claim 7, wherein the projection of the second plate comprises a first portion, defining a third surface inclined with respect to said second plate, and a second portion defining a fourth surface which is substantially parallel to said first and second surfaces.

9. The machine according to claim 8, wherein said heat control and safety devices are accommodated on said second portion.

10. The machine according to claim 1, wherein said thermal control and safety devices comprise at least one thermostat and one thermal fuse.

11. The machine according to claim 10, wherein a casing containing the thermostat and the thermal fuse is provided with side flaps fixed to the projection of the second plate.

12. The machine according to claim 1, wherein folds of the second plate are provided for centering the electric heating resistor with respect to the cap.

13. The machine according to claim 1, wherein the cap and the first plate are made of steel, and wherein said second plate is made of aluminum or aluminum alloys.

14. The machine according to claim 1, wherein at least one pipe is provided for the passage of a second liquid, said pipe crossing the container so as to be in thermal transmission contact with said first liquid, acting as a heat transmitting means, whereby said second liquid is indirectly heated by heating the first liquid.

15. The machine according to claim 1, wherein said second opening is positioned close to the electric heating resistor, so that the water can be heated immediately after it is introduced in container.

* * * * *